United States Patent [19]

Kaneno et al.

[11] Patent Number: 4,544,607
[45] Date of Patent: Oct. 1, 1985

[54] ENGINE PARTS

[75] Inventor: Isao Oda Nagoya; Masayuki Kaneno, Tokoname, both of Japan

[73] Assignee: NGK Insulators, Ltd., Japan

[21] Appl. No.: 596,566

[22] Filed: Apr. 4, 1984

Related U.S. Application Data

[63] Continuation of Ser. No. 420,341, Sep. 20, 1982, abandoned, which is a continuation of Ser. No. 282,518, Jul. 13, 1981, abandoned.

[30] Foreign Application Priority Data

May 21, 1981 [JP] Japan .................. 56-75623

[51] Int. Cl.$^4$ .................. C04B 35/48; B32B 15/04
[52] U.S. Cl. .................. 428/472; 501/103
[58] Field of Search .......... 423/608; 501/103, 104; 428/472; 277/224, 235

[56] References Cited

U.S. PATENT DOCUMENTS 4,360,598 11/1982 Otagiri et al. .................. 501/103

OTHER PUBLICATIONS

SAE Technical Paper Series 820429, "Ceramics for Adiabatic Engine Components", M. E. Woods et al.

Primary Examiner—Mark L. Bell
Attorney, Agent, or Firm—Parkhurst & Oliff

[57] ABSTRACT

This invention relates to engine parts having high durability, which can be used at high operating temperatures. The engine parts comprise component members consisting mainly of the partially stabilized zirconia having high strength which is excellent in thermal insulation and mechanical strength. As the partially stabilized zirconia having high strength, use is made of ones in which thermal expansion hysteresis (difference of thermal expansion at an optional temperature in the thermal expansion during heating up and the thermal shrinkage during cooling down) is less than 0.4% and thermal expansion coefficient is more than $10 \times 10^{-6}/°C$. The preferable engine parts having higher durability and reliability comprise component members consisting of a ceramic-metal composite body wherein the partially stabilized zirconia having a difference of thermal expansion coefficient being less than $3 \times 10^{-6}/°C$. and a metal are bonded.

7 Claims, 3 Drawing Figures

ENGINE PARTS

This is a continuation of application Ser. No. 420,341, filed Sept. 20, 1982 which in turn is a continuation of U.S. Ser. No. 282,518, filed July 13, 1981, both of which are abandoned.

The present invention relates to engine parts composed of ceramic materials having excellent thermal insulation and mechanical strength.

Recently, studies for improving heat efficiency by increasing the operating temperature of internal combustion engines, such as Diesel engine, gasoline engine and the like have been diligently made in view of energy savings. In this case, in order to increase the operating temperature of engines, engine parts must be formed of heat resistant materials. However, in the prior parts composed of only heat resistant metals, there is limitation in the heat resistance of the metal materials, so that it is difficult to obtain high operating temperatures of engines. Accordingly, it has been proposed, for example as described on Japanese Patent Laid Open Application No. 49,533/80 to use ceramic materials, such as oxides, nitrides, carbides etc. having excellent heat resistance, for engine parts. However, most of these ceramic materials are very brittle, some have low mechanical strengths and poor resistance to mechanical shock, which makes it difficult to use engine parts consisting only of ceramic materials. Therefore, it has been generally attempted to use ceramics, in the form of composite body, with a metal.

However, the above described ceramic materials can have low mechanical strengths and large differences between their thermal expansion coefficients and the thermal expansion coefficient of metals. Hence, the ceramic materials are subject to mechanical or thermal failure and the differences in thermal expansion coefficients between metal parts and ceramic parts have resulted in gaps or spaces between the ceramic to metal interface upon subjecting the body to normal operating conditions, resulting in the parts having no practical value or use.

The present invention has been made in order to solve these defects and problems and provides engine parts having excellent thermal insulation and mechanical strength, in which ceramic materials alone show satisfactorily results, as well as composite bodies combining individual ceramic and metal portions into a single piece. More particularly, the present invention consists of engine parts produced by using partially stabilized zirconia, having a high mechanical strength, the partially stabilized zirconia exhibiting a negligible deviation in expansion percents between the heating curve and the cooling cure within the temperature range of from temperature to 1000° C. The negligible deviation between the expansion percents at a particular temperature on the heating and cooling curves is less than 0.4%. The high strength partially stabilized zirconia has a thermal expansion coefficient of more than $10 \times 10^{-6}$/°C., and differs in thermal expansion by a value less than $3 \times 10^{-6}$/°C. from the thermal expansion of the metal part. The term "thermal expansion" used herein means linear thermal expansion. The term "engine parts" used herein means parts used for high temperature gas generating portions or flowing passages and the like of engines, for example cylinders, cylinder liners, cylinder heads, pistons, piston caps, bulb seats, exhaust port liners and other parts which simultaneously require high strength, thermal stability, thermal insulation, abrasion resistance and fitability with metal engine parts of internal combustion engines like Diesel engines, gasoline engines etc.

The present invention will be explained in more detail. Properties required of engine parts operating at high temperatures are that the heat resistance, mechanical strength, thermal shock resistance and the like must be excellent but in the case of engine parts composed of a ceramic-metal composite body, the compatibility of ceramic materials and metal materials is very important. The present invention uses partially stabilized zirconia having high strength as component members composing the engine parts but among the partially stabilized zirconia, it is particularly preferable to use partially stabilized zirconia in which the difference of thermal expansion (%) at an optional temperature between the thermal expansion curve during heating and thermal expansion curve during cooling is less than 0.4% for the entire temperature range from room temperature to 1,000° C. Preferably, the partially stabilized zirconia has thermal expansion coefficient of more than $10 \times 10^{-6}$/°C., a four-point bending strength of more than 50 kg/mm$^2$ and a thermal conductivity of less than 0.01 cal/cm.sec.°C.

The differing thermal expansion valves at the same temperature between the heating and cooling curves is generally known as thermal hysteresis. In order to use engine parts which operate at high temperatures, it is very important that the thermal hysteresis of the expansion curves are small and it is of critical importance that the maximum difference between the thermal expansion valves of the cooling and heating curves at any chosen temperature is less than 0.4%. This small thermal hysteresis is required before the engine parts of internal combustion engines are repeatedly subjected to high temperatures, the maximum temperature being approximately 1,000° C., and any ceramic portion exhibiting a large thermal expansion hysteresis, can be subjected to dimensional changes over a period of time, and when using the ceramic with metal as composite body, an excessive stress is experienced between the metal ceramic interface and gaps are formed at the interface between the two materials eventually resulting in separation and failure of the composite only. Accordingly, as mentioned above, the difference of thermal expansion (%) at the same temperature during heating up and cooling down should be less than 0.4%, preferably less than 0.3%. Furthermore, the thermal expansion coefficient, bending strength and thermal conductivity of the partially stabilized zirconia also are very important and it is preferable to satisfy the above described numeral values. When the engine parts are ceramic-metal composite bodies wherein partially stabilized zirconia and a metal are bonded, it is necessary that ceramics are arranged so as to face the high temperature side, the thermal expansion coefficient of the partially stabilized zirconia having high strength is more than $10 \times 10^{-6}$/°C. and the difference of thermal expansion coefficient from cast iron, stainless steel etc. generally used as metal part is small. In this case, the difference of thermal expansion coefficient of the partially stabilized zirconia part having high strength from metal part is preferably less than $3 \times 10^{-6}$/°C., more particularly less than $2 \times 10^{-6}$/°C.

The engine parts of the present invention may be produced, for example by the following manner. Fine powdery zirconium oxide having a crystalline size of less than 1,000 Å or amorphous fine powdery zirconium oxide is added with 1-8 mol% of $Y_2O_3$ or a total amount of 1-15 mol% of a mixture of $Y_2O_3$ and CaO to prepare a powdery mixture. The resulting powdery mixture is preliminarily molded into a given shape by a conventional process, such as isostatic pressing process, extrusion process, slip casting process and the like, the shaped article is subjected to a rough machining and fired at a temperature of 1,000°-1,500° C. to obtain a fired article. This fired article is partially stabilized zirconia composed mainly of tetragonal phase or a mixed phase of tetragonal and cubic and preferably having a content of monoclinic phase of less than 10% and an average crystal grain size of less than $2\mu$. This fired article is finally machined by means of lathe or grinding wheel and polished, if necessary, into the given shape of engine part. The surface roughness at the polished surface is preferred to be less than $10\mu$, particularly less than $1\mu$. This partially stabilized zirconia is referred to as "partially stabilized zirconia having high strength" of the present invention and this is the reason why the partially stabilized zirconia having high strength is different in the physical properties, particularly the strength and the thermal expansion property from stabilized zirconia consisting mainly of cubic phase or common partially stabilized zirconia consisting mainly of a mixed system of tetragonal phase and monoclinic phase and containing a fairly large amount of monoclinic system. The ceramic-metal composite bodies are produced by tightly contacting the above described ceramic part with a metal part and bonding these parts through press fitting process, bonding process through an intermediate layer or combination of these processes. When the bonding is carried out through press fitting process, an inner diameter of the metal part is adjusted so as to be smaller than an outer diameter of the ceramic part and heated at a temperature of 150°-400° C. and in the expanded metal part is fitted a ceramic part at a low temperature and the metal part is cooled whereby a compression stress is applied to the ceramic part and a tensile stress is applied to the metal part. As the process for bonding a metal part and a ceramic part through an intermediate layer, for example a metalized layer is formed by metal spraying on a bonding surface of a ceramic part and then the metalized layer and the metal part are contacted and heated to bond these parts.

The engine parts according to the present invention may be composed of the partially stabilized zirconia having high strength alone but in order to more increase the durability and reliability, a composite body with a metal part is preferred.

For better understanding of the invention, reference is taken to the accompanying drawings, wherein.

The following examples are given for the purpose of illustration of this invention and are not intended as limitations thereof.

EXAMPLE 1

Figure 1:
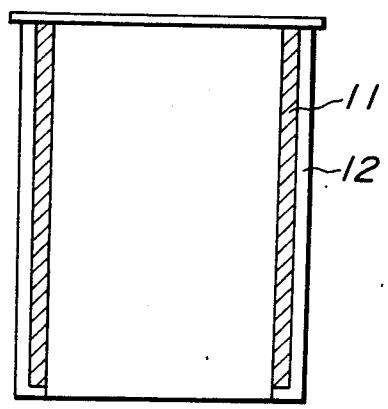
FIG. 1 is a cross-sectional view of a cylinder liner for Diesel engine composed of ceramic-metal composite body in Example 1 of the present invention.

A ceramic liner 11 composed of partially stabilized zirconia having high strength and consisting mainly of tetragonal phase and having an average crystal grain size of $2\mu$ and containing 5 mol% of $Y_2O_3$, was fitted in inside of a metal sleeve made of grey cast iron as shown in FIG. 1 by press fitting process to produce a cylinder liner for Diesel engine. For comparison, the same cylinder liner as described above was produced by using alumina and sintered silicon nitride. The physical properties of these three ceramic materials are shown in Table 1.

TABLE 1

|  | Ceramic material | Four-point bending strength (kg/mm$^2$) | Thermal expansion coefficient ($\times 10^{-6}$/°C.) | Thermal conductivity (cal/cm. sec. °C.) | Difference of thermal expansion coefficient of cast iron from ceramic ($\times 10^{-6}$/°C.) |
|---|---|---|---|---|---|
| Present invention | Partially stabilized zirconia having high strength | 61 | 10.3 | 0.006 | 0.2 |
| Prior sample | Alumina | 44 | 8.1 | 0.070 | 2.4 |
|  | Sintered silicon nitride | 55 | 3.3 | 0.067 | 7.2 |

Single cylinder engine test was made by using these three kind of cylinder liners and in the cylinder using alumina, cracks were formed in alumina liner in five minutes after starting the test and a part was fallen down and blow-by phenomenon was observed. In the cylinder using sintered silicon nitride, gap was formed between the liner and the metal sleeve in 10 minutes after starting the test and the liner was broken in 15 minutes and the blow-by phenomenon was observed. While, in the sample wherein the partially stabilized zirconia having high strength of the present invention, even after the test of 100 hours said sample normally operated without causing any abnormality. In the cylinder liners using alumina and sintered silicon nitride, the temperature of the metal sleeve was more than 100° C. higher than the temperature in the case using the partially stabilized zirconia having high strength and the heat loss was larger.

EXAMPLE 2

Figure 2:
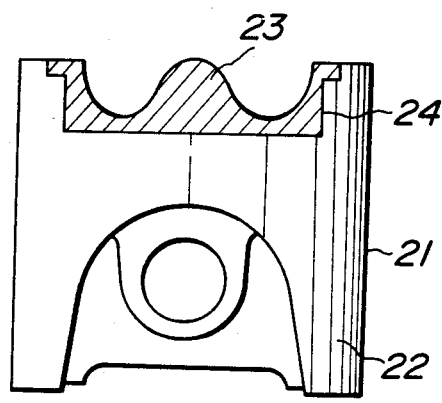
FIG. 2 is a cross-sectional view of a piston for Diesel engine composed of ceramic-metal composite body in Example 2 of the present invention.

A piston cap 23 shown in FIG. 2 was produced by using partially stabilized zirconia having high strength shown in the following Table 2 and said piston cap was fitted on upper portion of a piston 22 made of cast iron by shrink fitting process to produce a piston 21 composed of ceramic-metal composite body. This piston was assembled in Diesel engine and an engine test was made for 30 minutes by raising gas temperature to 850° C. The same test was carried out by using comparative samples in the following Table 2 produced in the same manner as described above. After the engine test, the piston caps were examined and in the piston according to the present invention, any degradation was not observed but in the comparative samples, cracks were formed in any piston cap and a part was fallen down.

the metal is very tight and even when said engine are operated at high temperatures for long time, no gap is formed between the bonding portion of both the parts and the ceramic inner cylinder is neither fallen down nor broken. Accordingly, the engine parts of the present invention have excellent strength, thermal stability, thermal insulating and abrasion resistance properties and can be usefully used as engine parts in cylinders, cylinder liners, cylinder heads, pistons, piston caps, bulb seats, exhaust port liner and any similar applications.

TABLE 2

| | Ceramic material | Bending strength (kg/mm$^2$) | Thermal expansion coefficient ($10^{-6}$/°C.) | Difference of thermal expansion during heating up and cooling down (%) | Difference of thermal expansion coefficient of cast iron from ceramic ($10^{-6}$/°C.) |
|---|---|---|---|---|---|
| Present invention | Partially stabilized zirconia having high strength | 61 | 10.3 | 0.2 | 0.2 |
| Comparative | Stabilized zirconia | 19 | 10.9 | 0 | 0.4 |
| | Partially stabilized zirconia | 30 | 8.6 | 0.1 | 1.9 |
| | Partially stabilized zirconia | 51 | 10.1 | 0.5 | 0.4 |

EXAMPLE 3

Figure 3:
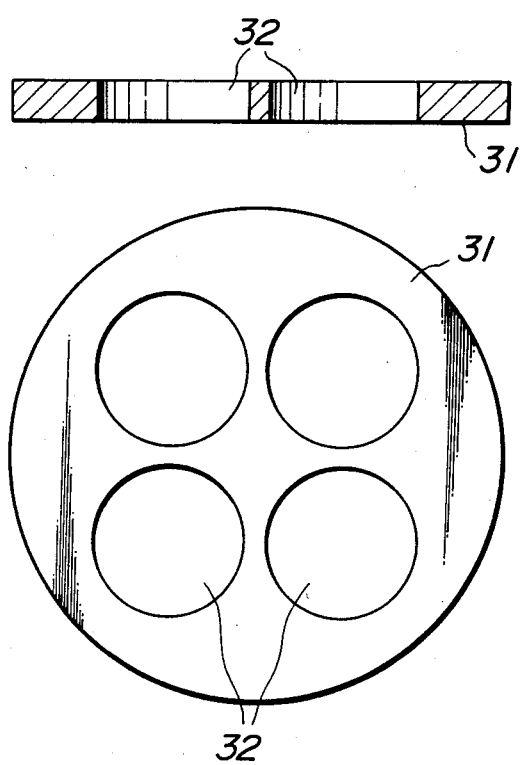
FIG. 3 is cross-sectional views of a cylinder head made of ceramic in Example 3 of the present invention.

By using partially stabilized zirconia having high strength and consisting mainly of a mixed phase of tetragonal and cubic and having 4 mol% of $Y_2O_3$, a cylinder head 31 shown in FIG. 3 was produced. For comparison, the same cylinder head as described above was produced by using silicon nitride shown in Table 1. These cylinder heads were assembled in Diesel engine and an engine test was made. In the partially stabilized zirconia having high strength according to the present invention, any degradation was not observed, while the cylinder head composed of silicon nitride in the comparative sample was larger in the difference of thermal expansion from metal in bulb seat and the like, so that abnormal gaps were formed between both the parts and said head was broken by the mechanical vibration.

As seen from the above explanation, in the engine parts using as a material composing said parts, the partially stabilized zirconia having high strength of the present invention, in which the difference of thermal expansion at the same temperature in the thermal expansion and shrinking curves during heating up and cooling down is less than 0.4%, that is the thermal expansion hysteresis is low, the engines can be operated at high temperatures because of the high heat resistance and thermal insulation possessed by the partially stabilized zirconia having high strength and the heat loss is low, so that the engine efficiency is higher and further the engine parts have such an excellent mechanical strength that the bending strength is more than 50 kg/mm$^2$, so that even when the engines are operated at high temperatures, said engines are scarecely broken owing to the mechanical shock and thermal shock. Furthermore, when the engine parts of the present invention are composed of a composite body of ceramic and metal, the difference of thermal expansion of ceramic from metal is very small and the hysteresis of thermal expansion is particularly small, so that the fitting of the ceramic and

What is claimed is:

1. A ceramic engine part which consists essentially of partially stabilized zirconia and a metal part bonded thereto, said partially stabilized zirconia consisting of a monoclinic crystal phase of zirconia in an amount less than 10% and either a tetragonal crystal phase of zirconia or a mixture of a tetragonal crystal phase of zirconia and a cubic phase of zirconia, and having a four point bending strength of at least 50 kg/mm$^2$, and a thermal expansion hysteresis which provides for a maximum difference in expansion percents of 0.4% existing between the thermal expansion heating curve and the thermal expansion cooling curve at any temperature occurring between room temperature and approximately 1000° C.

2. The ceramic engine part of claim 1, wherein the partially stabilized zirconia is press-fitted into the metal part to form a ceramic-metal composite body.

3. The ceramic engine part of claim 1, wherein the partially stabilized zirconia is bonded by a bonding layer to the metal part to form a ceramic-metal composite body.

4. The ceramic engine part of claim 1, wherein the partially stabilized zirconia is press-fitted by a bonding layer of the metal part to form a ceramic-metal composite body.

5. The ceramic engine part of claim 1, wherein the partially stabilized zirconia has a polished surface of less than 10 μm.

6. The ceramic engine part of claim 1, wherein the partially stabilized zirconia has a polished surface of less than 1 μm.

7. A ceramic engine part which consists essentially of partially stabilized zirconia and a metal part bonded thereto, said partially stabilized zirconia consisting of a monoclinic crystal phase of zirconia in an amount of less than 10% and either a tetragonal crystal phase of zirconia or a mixture of a tetragonal crystal phase of zirconia and a cubic crystal phase of zirconia, and having a four point bend test strength of at least 50 kg/mm$^2$, a thermal expansion hysteresis which provides for a maximum difference in expansion percents of 0.4% existing between the thermal expansion heating curve and the thermal expansion cooling curve at any temperature occurring between room temperature and approximately 1,000° C., and a thermal expansion coefficient of greater than $10 \times 10^{-6}$/°C., wherein said thermal expansion coefficient of said partially stablized zirconia differs from a thermal expansion coefficient of said metal by less than $3 \times 10^{-6}$/°C.

* * * * *